United States Patent [19]

Silverbrook

[11] Patent Number: 5,430,496
[45] Date of Patent: Jul. 4, 1995

[54] PORTABLE VIDEO ANIMATION DEVICE FOR CREATING A REAL-TIME ANIMATED VIDEO BY COMBINING A REAL-TIME VIDEO SIGNAL WITH ANIMATION IMAGE DATA

[75] Inventor: Kia Silverbrook, Woollhara, Australia

[73] Assignees: Canon Kabushiki Kaisha, Tokyo, Japan; Canon Information Systems Research Australia Pty Ltd., New South Wales, Australia

[21] Appl. No.: 53,194

[22] Filed: Apr. 28, 1993

[30] Foreign Application Priority Data

Apr. 29, 1992 [AU] Australia .................. PL2157

[51] Int. Cl.[6] .................................. H04N 5/262
[52] U.S. Cl. ........................... 348/589; 348/600
[58] Field of Search ............ 358/183, 22, 182; H04N 5/262; 348/589, 600

[56] References Cited

U.S. PATENT DOCUMENTS

| | | | |
|---|---|---|---|
| 5,027,212 | 6/1991 | Marlton et al. | 358/183 |
| 5,155,595 | 10/1992 | Robison | 358/149 |
| 5,225,908 | 7/1993 | Lee | 358/149 |

*Primary Examiner*—James J. Groody
*Assistant Examiner*—Cheryl Cohen
*Attorney, Agent, or Firm*—Fitzpatrick, Cella, Harper & Scinto

[57] ABSTRACT

A portable video animator device for creating a real-time animated video signal by combining a real-time video signal with animation data includes a video input device for inputting a real-time video signal, an image input device for inputting animation image data, a host processor for selecting animation image data representing an animated image from the input animation image data and a real-time processor for rendering the selected animation image data with the real-time video signal to produce a real-time video signal.

16 Claims, 4 Drawing Sheets

Fig. 3

PORTABLE VIDEO ANIMATION DEVICE FOR CREATING A REAL-TIME ANIMATED VIDEO BY COMBINING A REAL-TIME VIDEO SIGNAL WITH ANIMATION IMAGE DATA

BACKGROUND

1. Field of the Invention

The present invention relates to video animation systems and, in particular, discloses a substantially pocket-sized device that can be used to combine a video signal with one or more animation signals.

2. Summary of the Invention

In accordance with the present invention there is disclosed a portable video animation device comprising an input for a real-time video signal, and an input for animation image data, host processor means for selecting one animated image from said image data, and real-time processor means for rendering said animated image and subsequently combining same with said video signal to provide a real-time animated video signal.

BRIEF DESCRIPTION OF THE DRAWINGS

A preferred embodiment of the present invention will now be described with reference to the drawings in which.

DETAILED DESCRIPTION OF THE PREFERRED EMBODIMENT

The present invention is specific application of technology disclosed in U.S. patent application Ser. No. 08/053,373, filed Apr. 28, 1993, claiming priority from Australian Patent Application No. PL2147, filed Apr. 29, 1992, entitled "A Real-Time Object Based Graphics System"; U.S. patent application Ser. No. 08/053,212, filed Apr. 28, 1993, claiming priority from Australian Patent Application No. PL2148, filed Apr. 29, 1992, entitled "Method and Apparatus for Filling an Object Based Rasterised Image"; U.S. patent application Ser. No. 08/053,214, filed Apr. 28, 1993, claiming priority from Australian Patent Application No. PL2153, filed Apr. 29, 1992, entitled "Method and Apparatus for Providing Transparency in an Object Based Rasterised Image"; U.S. patent application Ser. No. 08/053,365, filed Apr. 28, 1993, claiming priority from Australian Patent Application No. PL2156, filed Apr. 29, 1992, entitled "Edge Calculation for Graphics Systems" and Australian Patent Application No. PL2145, filed Apr. 29, 1992, entitled "Object Sorting for Graphics Systems"; U.S. patent application Ser. No. 08/053,378, filed Apr. 28, 1993, claiming priority from Australian Patent Application No. PL2142, filed Apr. 29, 1992, entitled "A Preprocessing Pipeline for RTO Graphics System"; U.S. patent application Ser. No. 08/053,219, filed Apr. 28, 1993, claiming priority from Australian Patent Application No. PL2150, filed Apr. 29, 1992, entitled "Object Based Graphics Using Quadratic Polynomial Fragments"; and U.S. patent application Ser. No. 08/053,213, filed Apr. 28, 1993, claiming priority from Australian Patent Application No. PL2149, filed Apr. 29, 1992, entitled "Bezier Spline to Quadratic Polynomial Fragment Conversion," all lodged by the present applicant, the disclosure of each of which is hereby incorporated by reference.

Figure 1A:
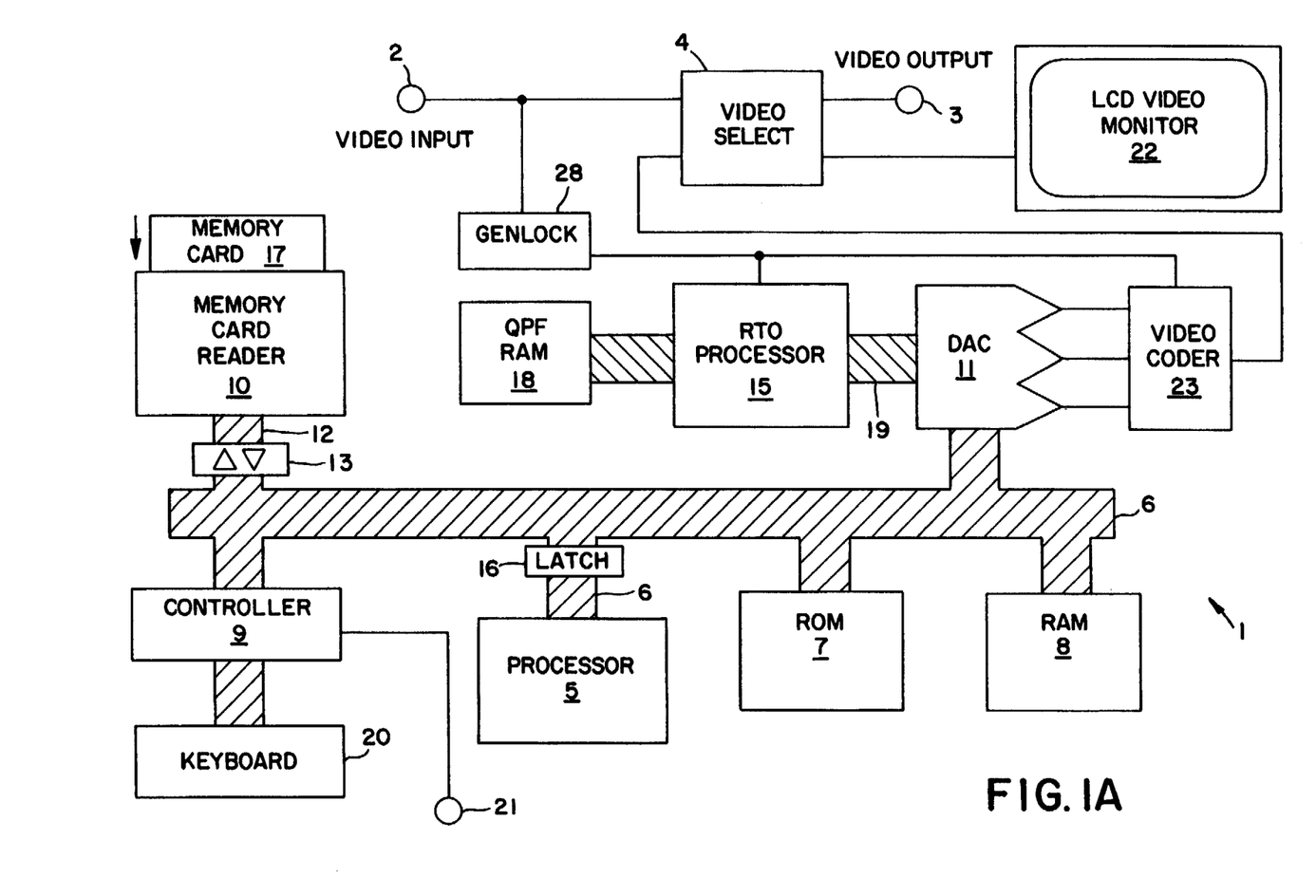
FIG. 1A is a schematic block diagram of the preferred embodiment and FIG. 1B illustrates a single quadratic polynomial fragment (QPF)

Referring now to FIG. 1A, there is shown a first embodiment of the present invention in the form of animation system 1, which can receive video input signals via a video input port 2, which supplies the input signal to a video select switch 4, which can selectively output the signal to a dedicated output 3 or a monitor such as an LCD Video monitor 22. Also provided in the animation system 1 is a host processor 5 connected to a processor bus 6 via an address latch 16. Also connected to the processor bus 6 are a system ROM 7, a system RAM 8, a serial controller 9, a memory card interface socket 10, an RTO processor 15, and a RAMDAC 11.

The host processor 5 is a general purpose microprocessor which is arranged to control the generation of object based images. In the preferred embodiment, the host processor 5 is a 32-bit microprocessor such as the INTEL i960SA, which permits high speed operation at low cost and has a wide addressing range. The host processor 5 operates to create and maintain multiple object lists which are stored in the system RAM 8 and which include multiple objects which are ultimately processed by the RTO processor 15 to form an image. The calculations for image generation are generally only performed at the graphics object level. For each image that is to be created, the host processor 5 specifies the position, size, and colour of each object that is to appear in the final image. The host processor 5 also interacts with the serial controller 9 to communicate with a keyboard 20 which allows the user to interface with the animation system 1 for command and control, including the selection of graphic objects to form an image for printing. The serial controller 9 interprets keyboard commands from the keyboard 20 and forwards the keyboard commands to the host processor 5 via the processor bus 6.

The host processor 5 has a 16-bit external data bus which is multiplexed with a 32-bit address bus. In addition, there are 16 control signals provided by the host processor 5. The most significant 16 address bits (bits 31-16) are not multiplexed, However address bits 15-4 are demultiplexed by address latch 16. The host processor 5 has secondary control of the processor bus 6 whilst the RTO processor 15 can obtain access to the bus 6 via DMA whenever it requires such access, except whenever specifically locked out via software controlling the host processor 5. The address latch 16 is of a tri-state nature and is only used when the host processor 5 has control of the bus 6. The address bits 3,2, 1 are demultiplexed directly by the host processor 5 to avoid any latch delays during burst accesses. During bursts the upper address bits and the latched address bits remain static while address bits 3-1 count up. Thus host processor bursts are limited to 16 bytes. These bursts can occur in several combinations of byte and half-word accesses. All address decoding is based on the upper 4 address lines (aligned to 256 Mbyte boundaries), so one host processor burst cannot span multiple devices.

The multiplexed data bus of the host processor 5 is used to directly control the RTO processor 15, system RAM 8, system ROM 7, serial controller 9 and the memory card interface socket 10.

Arbitration of the processor bus 6 takes place between the host processor 5 and RTO processor 15. The host processor 5 masters the bus 6 until RTO processor 15 is commanded (by the host processor 5) to begin operation. RTO processor 15 then takes control of the processor bus 6 and will notify the host processor 5 when it is finished. The host processor 5 has no mechanism to stop RTO processor 15 from obtaining the processor bus 6 except by halting the RTO processor 15 from operation. The RTO processor 15 will attempt to completely prepare an object list for display once started and can use the processor bus 6 continuously once it gets it (if the RTO processor 15 is rendering at the same time it may bottleneck internally and release the processor bus 6 until it is able use it again). Multiple object lists can be used to make up an image, and hence the system software can use this approach to prevent the RTO processor 15 from holding too long a mastership of the processor bus 6.

The host processor 5 communicates with the various other devices of the animation system 1 by means of memory mapped I/O. The upper 4-bits of the processor bus 6 are decoded by PALs (programmable array logic(s) not shown) to provide all necessary enable and select signals, read and write strobes, buffer controls and the ready signal for the host processor 5. This logic is active when the host processor 5 masters the bus 6 and when RTO processor 15 masters the bus 6.

The system ROM 7 contains 512 kilobytes of ROM which is generally provided by a single 256K×16 device. The system ROM 7 contains the controlling program for the animation system 1 as well as various examples of images, fonts, clip titles, and other data used in the animation system 1. Both the host processor 5 and RTO processor can access the memory in the system ROM 7 and single and burst accesses are supported. Preferably, the system ROM 7 is wired so that larger ROMs can be used when they become readily available.

The system RAM 8 contains 256K bytes of RAM which consist of two 128K×8 devices. The system RAM 8 is used by the host processor 5 for the caching of graphics objects including QPF lists, the caching of performance critical code, and as a variable storage. Single and burst accesses are supported, as are byte writes. Preferably, the system RAM 8 is also wired so that larger RAMs can be used when they become readily available.

The memory card interface socket 10 provides for the insertion of standardized memory cards. Typically, these sockets are adapted to take cards conforming to both the JEIDA and PCMIA standards. JEIDA (Japanese Electronics Industry Development Association) and PCMCIA (PC Memory Card International Organization) have released substantially identical standards for the use of 68 pin interchangeable memory cards. Each memory card 17 can be typically used as ROM devices incorporating object graphic data, but can also be either flash EPROM or static RAM with battery backup. Each memory card 17 is used to store libraries of graphics objects, object edit lists, clip titles, fonts, characters, animation sequences and/or special programs which can be used to replace or supplement all or part of the programs within system ROM 7. Where a video image comprises one or more animated objects, each object must be updated 60 times per second for NTSC systems, or 50 times per second for PAL systems.

Where static RAM cards are used then these can also be used for storage of a user's images. Preferably the memory card interface socket 10 is capable of accommodating cards with increased storage capabilities as they become available.

The memory card bus 12 to the memory cards is preferably buffered by buffer 13 from all other devices accessing the processor bus 6. This is to ensure that the memory cards do not interfere with the logic levels of the processor bus 6 at any stage. Since a memory card 17 can be inserted or removed by the user at any time, some bus problems may be unavoidable. Short pins in the memory card interface socket 10 can be used to provide interrupts a short time before the card is removed. If the RTO processor 15 is mastering the processor bus 6 when a card is removed, the recovery time for the host processor 5 software will be reduced by the maximum bus tenure of the RTO processor 15. The memory card interface socket 10 is provided with short card detect pins which generate insertion and removal interrupts for the indication of the presence or otherwise of a memory card 17. The signals are sent to the serial controller 9 where they can be used for detection of removal, or insertion of crooked memory cards. The detected memory card signal can then be relayed to the host processor 5 through a general interrupt. This allows notification of a software event to update the current state of the host processor 5 to take account of the removal, or insertion.

In order to determine the nature of the memory card 17 inserted, an optional attribute memory can be read from the memory card 17. This attribute memory is only 8 bits wide and is read on the low data bus and is accessed at the predetermined memory address of the memory card. This allows the animation system 1 to be used in conjunction with memory cards of different attributes and speeds. Preferably system software is provided to interrogate the memory cards and decide, based on their speed and optional attribute memory, how the RTO processor 15 and the host processor 5 will best be able to safely access the memory cards.

Where SRAM type memory card devices with battery backups are supported, the memory card socket 10 is provided with battery condition signals that are connected to the serial controller 9 and indicate whether the battery is good or bad.

The serial controller 9 is preferably implemented by a Exar 82C684 Quart device which includes four, full duplex, asynchronous serial channels, two timers and sixteen general purpose input and output ports. The connection of the serial controller 9 to processor bus 6 is only 8 bits wide so all accesses only exist on the lower (even) byte of the processor bus 6. A serial communications link 21 is used to communicate with the keyboard 20 for the interactive entry of user requests, commands, selections and information. Additionally, the serial controller 9 is also used for timer events, serial communication, special keyboard keys and memory card insertion and removals which can be communicated to the host processor 5 through an interrupt.

The RTO processor 15 is setup and controlled by the host processor 5 for the real-time rendering of object based graphic image and a full description of a specific example of the RTO processor 15 can be found in U.S. patent application Ser. No. 08/053,373 filed on Apr. 28, 1993, claiming priority from Australian Patent Application No. PL2147 of 29 Apr. 1992 by the same applicant, the disclosure of which is again incorporated by cross-reference.

The RTO processor 15, apart from interfacing with the processor bus 6, also interfaces with its own dedicated QPF memory 18, which is implemented as 512k bytes of 25 ns local QPF memory (four 128K×8 rams). These rams are always enabled, and RTO processor 15 drives the read and write strobes directly.

Once setup and started, the RTO processor 15 reads lists of objects from the system ROM 7, the system RAM 8, or the memory cards into its own local memory, prepares the objects, and then renders the objects, outputing an 8 bit data word in the form of RTO processor output level bus 19, for each pixel of the output device, which describes the level and effects desired for the highest visible object active at the pixel. Preferably, the display lists include object outline data which permit the calculation of graphic images in real time. An example of such data is quadratic polynomial fragments (QPF) which are normally cached in the system RAM 8, but can be read directly from the system ROM 7 or from memory card 17.

A quadratic polynomial fragment will be discussed below in greater detail with respect to FIG. 1B.

Figure 1B:
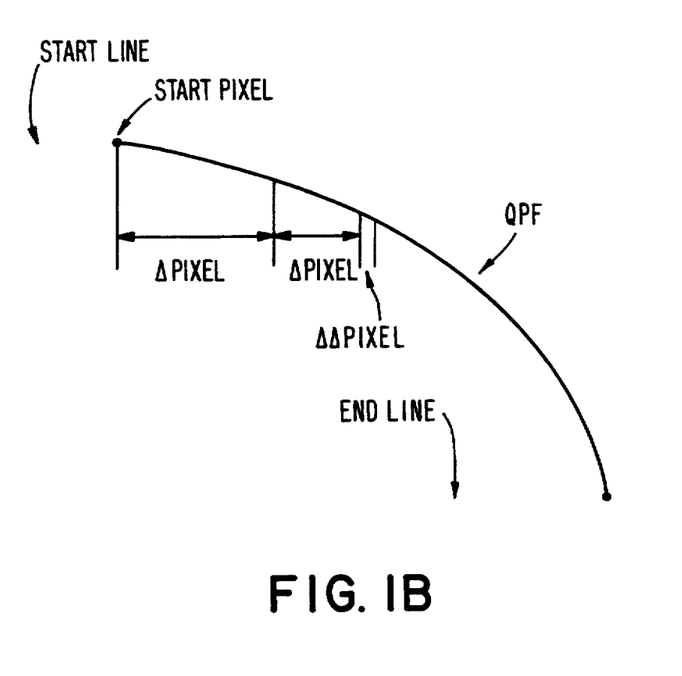

Referring to FIG. 1B, a quadratic polynomial fragment (QPF) is a fragment which forms part of an object outline extending from a start line to an end line within a raster display. The QPF is a curve characterized by a constant change in slope of the line and in this manner, each fragment of any object outline can be described using a quadratic polynomial.

Because each QPF slope changes in a constant manner along its length, each QPF can be readily defined by a number of parameters. The first of these parameters is the START_LINE which specifies the first line in raster order upon which the QPF appears. The next parameter is the START_PIXEL which specifies the pixel value (i.e., location) of the QPF on the start line. The next parameter is ΔPIXEL which specifies the slope of the line. ΔPIXEL is added to start pixel for each raster line of the display. The next parameter is ΔΔPIXEL which specifies the curvature of the line. ΔΔPIXEL is added to ΔPIXEL each raster line. The last parameter is the END_LINE which specifies the last line on which the QPF appears.

With the foregoing parameters, the pixel locations on each of the scan (raster) lines of the QPF can be determined in the following manner:

PIXEL (line$_{n+1}$)=PIXEL (line$_n$)+ΔPIXEL (line$_n$)
ΔPIXEL (line$_{n+1}$)=ΔPIXEL (line$_n$)+ΔΔPIXEL
where
PIXEL (line$_n$=START_LINE)=START_PIXEL; and
ΔPIXEL (line$_n$=START_LINE)=ΔPIXEL.

After reading the display list in the form of QPF's, the RTO processor 15 scales and translates the QPF objects in each of the X and Y directions. This allows the implementation of squash and stretch effects, as well as the compensation for different pixel aspect ratios found on different output devices.

Next, QPF's which have been translated or scaled as to now be entirely off the screen are removed from the object list by culling. QPF's which are too small to be visible, are also culled. QPF's which cross the boundaries of the output device are also clipped. After initial processing, the QPF's are stored in the dedicated QPF memory 18. Once all the QPF's are stored in the dedicated QPF memory 18, they are sorted into line order and then pixel order in terms of the position of each of the first pixel in each QPF. Subsequently, the intersections of all QPF's with scan lines that they cross are calculated. This is performed in real-time without the use of a frame store. QPF's are not flattened into straight lines before intersection calculation, and accordingly curvature is preserved in the curves even at high magnification. After intersection calculation, the visible ordering of objects is determined and hidden surfaces are removed. Regions of colour are then filled by extending the priority levels for each QPF until the next intersection. Transparency and effect calculations are then performed in hardware and at real-time data rates. In this manner, the RTO processor 15 outputs pixel data for display on raster displays or printing on a copier device in a synchronous manner and comprises colour level data which is transferred via the 8-bit level RTO processor output level bus 19.

When RTO processor 15 is a slave to the host processor 5, the host processor 5 is able to read the control registers of the RTO processor 15 in addition to reading the dedicated QPF memory 18. Access to control registers of the RTO processor 15 is performed by memory mapped I/O techniques. The base address for accessing the dedicated QPF memory 18 is programmed into RTO processor 15 registers at start-up and is also set according to the host processor memory map table. The RTO processor 15 does not support burst access or byte writes to its registers or dedicated QPF memory 18.

When the RTO processor 15 is in control of the processor bus 6, the RTO processor 15 drives the demultiplexed address and data buses directly. As mentioned previously, it requests use of the processor bus 6 by notification and subsequent grant from the host processor 5.

The RTO processor 15 has an interrupt out signal which is connected to and forms the host processor 5 highest priority interrupt (INT0). This interrupt can be used to indicate many events including completion of operations and internal error events.

The 8-bit contents of the RTO processor output level bus 19 are used to form the address of the RAMDAC 11 which is used as a colour palette between the RTO processor 15 and LCD Video monitor 22. The RAMDAC 11 can be a standard 478 type RAM DAC for example, which assigns a colour to each object level. This colour can be any of 16 million colours in the digital video colour gamut. This output can be either RGB, or YUV, in CCIR 601 4:4:4 format. One port of the RAMDAC 11 outputs the analogue equivalent of the colour selected by the RTO processor 15 to a video coder 23.

The other port of the RAMDAC 11 is connected to the processor bus 6. This port is writable and will permit burst accesses by the host processor 5 and can be used by the host processor 5 to alter the colour palette area by software control. Hence the colour palettes can be changed at any time by the host processor 5 including between the time that the LCD Video monitor 22 is between frames.

A genlock circuit 28 is provided which synchronises both the RTO processor 15 and the video coder 23 to the video input signal. When supplied by the video coder 23, the video select switch 4 acts to combine the video input signal with the animated signal derived from the RAMDAC 11. The output therefore is a combined real time video and animation signal which can be displayed.

The video coder 23 outputs the current pixel colour in addition to pixel clocking information, frame enablement signals and line enable signals to the video select switch 4 according to its specific timing requirements. The video select switch 4 is used such that the calculated video signal can be switched to either the video output 3 or to the monitor 22.

The RAMDAC 11 also includes a special object colour. This "colour" is used by the video select switch 4 to select the video input. As this "colour" is able to be animated in the same manner as any other colour, the animation system 1 is capable of fully animated video wipes and keys. These wipes can be between the video input and graphics, or between a fade of video input and graphics.

Figure 2A:
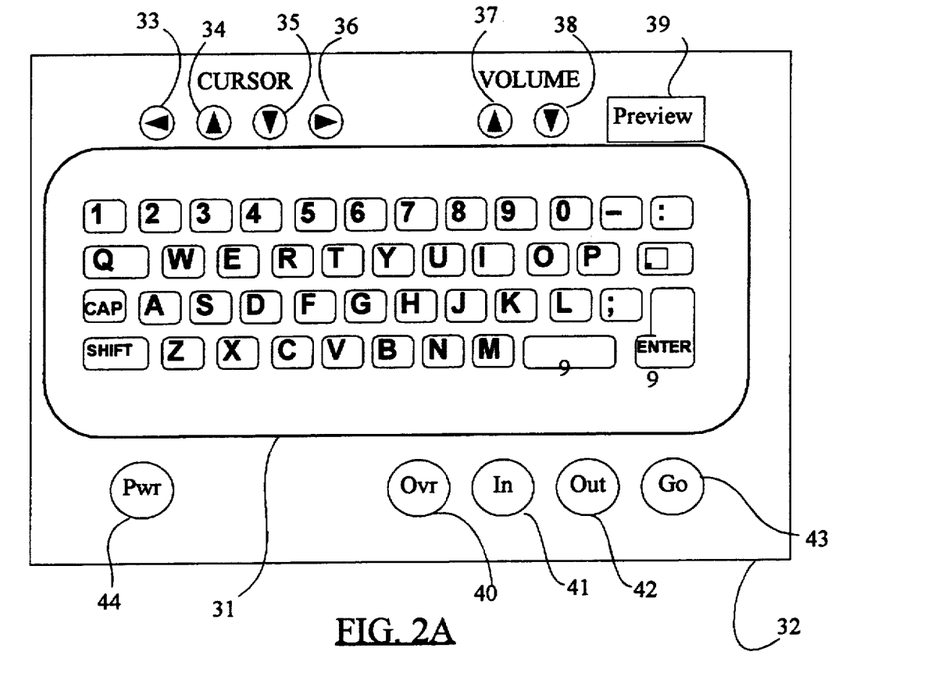
FIG. 2A is a representation of one part of the keyboard used in the embodiment of FIG. 1.

FIG. 2A shows a keypad 32 which forms part of the keyboard 20. The keypad 32 includes a QWERTY keypad 31 and a number of individual keys which perform special functions. Cursor control for the movement of objects is provided using cursor keys 33, 34, 35 and 36 and volume control keys 37 and 38 allow for altering the intensity of sound effects. A preview key 39 is provided to allow the user to preview a predetermined animation sequence which can be preset using a number of control keys such as OVER 40, IN 41, OUT 42, and GO 43. A power ON/OFF key 44 is also provided in the usual manner.

Figure 2B:
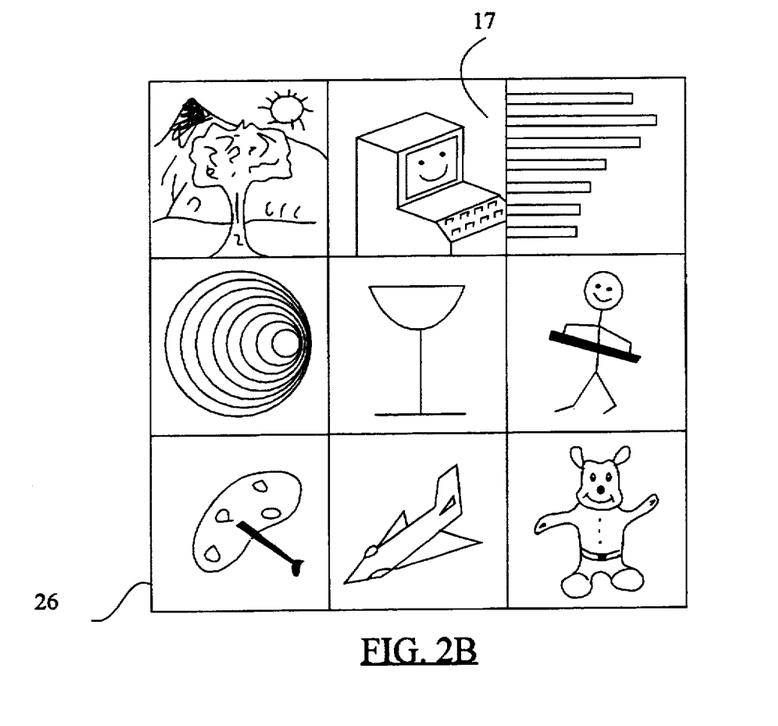
FIG. 2B shows one example of a touch panel configuration forming another portion of the keyboard of FIG. 1.

FIG. 2B illustrates a touch panel 26 which forms part of the keyboard 20 and, preferably, sits over the inserted memory card 17 and over the memory card interface socket 10. The memory card 17, as earlier described, includes data corresponding to a number of object based animated images.

Figure 3:
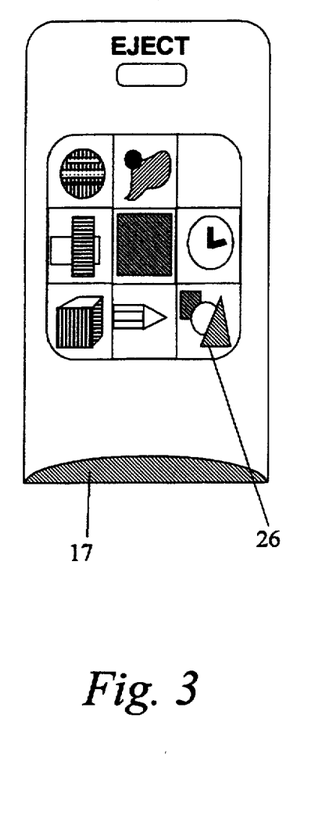
FIG. 3 is a schematic illustration oft he touch panel arrangment.

FIG. 3 illustrates how those images can be printed onto the memory card 17 such that they align within various portions of the touch panel 26 which can thereby be selected by a user. As seen in FIG. 2B, the touch panel 26 displays the contents of the memory card 17 in the form of animated objects including (1) a landscape having a central tree, (2) a computer terminal, (3) a histogram, (4) a set of circles, (5) an elevation view of a glass, (6) a "stick man" carrying an object, (7) a painter's pallet and brush, (8) an aeroplane, and (9) a cartoon character.

A combination of the images provided on the memory card 17 and the operation of the animation system 1 in general allows for alterable animation to be provided for the consumer video market. Alterable animation is a combination of pre-formatted animations, such as those provided on the memory card 17 which are created by expert animators, as well as text entered by the user, various user choices, sound effects, and the user's real-time images provided at the video input port 2.

The system of alterable animation is operated in the following manner:

1. one of the nine alterable animations on the memory card 17 is selected by depressing the touch panel 26 over the picture of the desired animation.

2. any text required is typed in on the keyboard 20.

3. any "canned" graphics required is selected, such as that stored in the system ROM 7 or existing in the dedicated QPF memory 18.

4. OVER, IN or OUT animation type is selected.

5. as the video is being recorded, the GO button is pressed.

OVER, IN and OUT are three animation sequences which produce various video effects.

An OVER sequences produces animation, includes titles, which appears superimposed over live video provided at the video input port 2. Both the start and the end of the animation sequence leave the video image as 100% video, with no animation superimposed.

An OUT animation sequence "fades" out the live video to a still image. The OUT sequence can happen in many ways, but is based upon the principle that the live video is progressively obscured until it becomes 100% graphics.

An IN animation sequence leads into the live video from a still image.

An OUT and an IN sequence combine to provide a sophisticated transition from one video shot to the next, even when the animation system 1 is being operated with a single video camera/recorder (sometimes professionally and commercially referred to as a "camcorder"). This is because an OUT always ends in a computer generated still image. The corresponding IN starts from the same computer generated still. Therefore, video recording can be stopped after an OUT and a new shot can be set up. The new shot is started with the corresponding IN, resulting in complete video continuity.

The foregoing describes only one embodiment of the present invention and other embodiments, obvious to those skilled in the art can be made thereto without departing from the scope of the present invention.

I claim:

1. A portable video animation device for creating a real-time animated video signal by combining a real-time video signal with animation image data, comprising:

video input means for inputting a real-time video signal;

image input means for inputting animation image data, said animation image data including object outline data;

host processor means for selecting animation image data representing an animated image from said input animation image data; and real-time processor means for rendering object outline data of said selected animation image data and combining said rendered object outline data with said real-time video signal to produce a real-time animated video signal.

2. A portable video animation device according to claim 1, wherein said real-time image processor means comprises real-time processor means for rendering animation image data, and colour transformation means, connected to said real-time processor means, which receives said rendered animation image data and creates said real-time animated video signal from said rendered animation image data and said real-time video signal.

3. A portable video animation device according to claim 2, wherein said colour transformation means is connected to said host processor means and setup and control information for said colour transformation means is alterable by said host processor means.

4. A portable video animation device according to claim 3, wherein said colour transformation means comprises a RAMDAC device.

5. A portable video animation device according to claim 1, wherein said animation image data comprises quadratic polynomial fragments.

6. A portable video animation device according to claim 1, wherein said image input means for inputting animation image data includes a plurality of memory storage housing means, each of which is adapted to receive a detachable memory storage device containing animation image data representing an animated image.

7. A portable video animation device according to claim 6, wherein said detachable memory storage device comprises a non-volatile memory card.

8. A portable video animation device according to claim 6, wherein said detachable memory storage device stores a system code used in the operation of said host processor means.

9. A portable video animation device according to claim 6, wherein said image input means for inputting animation image data further comprises detection means for detecting the presence of said detachable memory storage device.

10. A portable video animation device according to claim 6, further comprising a touch panel for inputting animation image data which is sensitive to a user's touch and which transmits data relating to a location of said input animation image data to said host processor means.

11. A portable video animation device according to claim 10, wherein said touch panel is mounted over one of said plurality of memory storage housing means.

12. A portable video animation device according to claim 1, wherein said real-time processor means comprises a video coder means for converting said rendered animation image data to a real-time video signal.

13. A portable video animation device according to claim 1, wherein said real-time processor means comprises a video selector means for selecting between said real-time video signal and said rendered animation image data.

14. A portable video animation device according to claim 13, wherein said selector means determines said selection based on the colour of said rendered animation image data.

15. A portable video animation device according to claim 1, further comprising a genlocking means for producing synchronization signals from said real-time video signal, wherein said real-time processor means is connected to said genlocking means and uses said synchronization signals to produce said rendered animation image data.

16. A portable video animation device according to claim 1, further comprising data input means connected to said host processor means, said data input means comprising:

fade out signal input means which, upon activation, causes progressively greater portions of rendered animation image data to be included in said real-time animated video signal;

fade in signal input means which, upon activation, causes progressively lesser portions of rendered animation image data to be included in said real-time animated video signal; and over signal input means which, upon activation, eliminates the animated portion of said real-time animated video signal at the beginning and end of said real-time animated video signal.

* * * * *

UNITED STATES PATENT AND TRADEMARK OFFICE
CERTIFICATE OF CORRECTION

PATENT NO. : 5,430,496

DATED : July 4, 1995

INVENTOR(S) : Kia Silverbrook

It is certified that error appears in the above-indentified patent and that said Letters Patent is hereby corrected as shown below:

<u>COVER PAGE</u>

Under [75] Inventor, "Woollhara" should read --Woollahra--.

<u>COLUMN 1</u>

Line 35, "oft he" should read --of the--.

Signed and Sealed this

Twenty-fourth Day of October, 1995

Attest:

BRUCE LEHMAN

*Attesting Officer*   Commissioner of Patents and Trademarks